(12) United States Patent
Tamai

(10) Patent No.: US 9,843,272 B2
(45) Date of Patent: Dec. 12, 2017

(54) POWER CONVERTER CAPABLE OF OUTPUTTING A PLURALITY OF DIFFERENT LEVELS OF VOLTAGES

(71) Applicant: TOSHIBA MITSUBISHI-ELECTRIC INDUSTRIAL SYSTEMS CORPORATION, Tokyo (JP)

(72) Inventor: Shinzo Tamai, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 700 days.

(21) Appl. No.: 14/183,985

(22) Filed: Feb. 19, 2014

(65) Prior Publication Data

US 2014/0300195 A1    Oct. 9, 2014

(30) Foreign Application Priority Data

Apr. 4, 2013    (JP) .................................. 2013-078456

(51) Int. Cl.
*H02M 7/487*    (2007.01)
*H02M 1/00*    (2006.01)

(52) U.S. Cl.
CPC ...... *H02M 7/487* (2013.01); *H02M 2001/007* (2013.01); *Y10T 307/707* (2015.04)

(58) Field of Classification Search
CPC . H02J 3/383; H02J 3/386; H02M 7/44; Y10T 307/707; Y02E 10/563

(Continued)

(56) References Cited

U.S. PATENT DOCUMENTS

| 7,292,460 B2 | 11/2007 | Barbosa et al. |
| 2013/0088901 A1* | 4/2013 | Bleus .................... H02M 7/487 363/71 |

(Continued)

FOREIGN PATENT DOCUMENTS

| JP | 7-231673 A | 8/1995 |
| JP | 2000-341964 | 12/2000 |

(Continued)

OTHER PUBLICATIONS

S W Amos, R S Amos, Newnes Dictionary of Electronics, Reed Educational and Professional Publishing Ltd 1999, Fourth Edition 1999, pp. 227 and 289.*

(Continued)

*Primary Examiner* — Thienvu Tran
*Assistant Examiner* — David M Stables
(74) *Attorney, Agent, or Firm* — Oblon, McClelland, Maier & Neustadt, L.L.P.

(57) ABSTRACT

A power converter includes $2^n$ charge storage elements connected in series in this order, n being a natural number of 2 or more, a first switch element and a first diode connected in series in this order between terminals of a first charge storage element, a second diode and a second switch element connected in series in this order between terminals of a $2^n$th charge storage element, a third diode and a fourth diode connected in series in this order between terminals of each of the second charge storage element to a $2^n-1$th charge storage element, $2^n$ leads each connected to a node between the first switch element and the first diode, a node between the third diode and the fourth diode, and a node between the second diode and the second switch element, and $2^n-1$ switch circuits for selecting one of outputs output to the $2^n$ leads.

3 Claims, 5 Drawing Sheets

(58) Field of Classification Search
USPC .......................... 307/82, 112, 113; 363/56.12
See application file for complete search history.

(56) References Cited

U.S. PATENT DOCUMENTS

2014/0192572 A1* 7/2014 Tamai ................... H02M 7/487
363/56.12
2014/0292089 A1* 10/2014 Tamai ................... H02M 7/487
307/82

FOREIGN PATENT DOCUMENTS

| JP | 2010-246267 | 10/2010 |
| WO | 2011/120970 A1 | 10/2011 |

OTHER PUBLICATIONS

Office Action dated Mar. 1, 2016 in Japanese Patent Application No. 2013-078456 (with English language translation).
U.S. Appl. No. 14/138,980, filed Dec. 23, 2013, Tamai.
U.S. Appl. No. 14/184,030, filed Feb. 19, 2014, Tamai.
L.A. Serpa, et al., "Virtual-Flux Decoupling Hysteresis Control for the Five-Level ANPC Inverter Connected to the Grid", IEEE 2008, 6 pages.

* cited by examiner

POWER CONVERTER CAPABLE OF OUTPUTTING A PLURALITY OF DIFFERENT LEVELS OF VOLTAGES

BACKGROUND OF THE INVENTION

Field of the Invention

The present invention relates to power converters, and particularly to a power converter capable of outputting a plurality of different levels of voltages.

Description of the Background Art

A power converter that converts direct current (DC) power to alternating current (AC) power by varying continuous output of DC voltages from a plurality of DC power sources during a single cycle has been proposed. This power converter converts DC power to AC power by continuously outputting a plurality of DC voltages of different potentials, rather than generating a constant pulsed voltage like an inverter having a single DC power source. Accordingly, this power converter can continuously output the plurality of DC voltages of different potentials finely without waste, to convert DC power to AC power with suppressed harmonics compared with a power converter having a single DC power source.

For example, Japanese Patent Laying-Open No. 2000-341964 discloses a multilevel inverter as the above-described power converter. According to this patent publication, the multilevel inverter includes redox flow type secondary batteries connected in series and producing multilevel terminal voltages, and an inverter unit for controlling continuous output of potentials of the multilevel terminals to produce AC power. The inverter unit includes a total of eight switching elements and six diodes, and controls the opening/closing of the switching elements in response to instructions from a control unit.

FIG. 6 is a circuit diagram illustrating a circuit configuration of a conventional power converter such as disclosed in the aforementioned patent publication. Referring to FIG. 6, a power converter 100 is a five-level inverter capable of outputting five different levels of voltages. Power converter 100 includes four DC power sources V, eight switch elements S101 to S108, and six diodes D101 to D106.

Power converter 100 has a midpoint $V_0$ as the middle point between four DC power sources V, midpoint $V_0$ having a voltage level of "0V". Accordingly, in power converter 100, the first DC power source V on the positive potential side relative to midpoint $V_0$ has a voltage level of "+1V", and the second DC power source V on the positive potential side relative to midpoint $V_0$ has a voltage level of "+2V". Conversely, in power converter 100, the first DC power source V on the negative potential side relative to midpoint $V_0$ has a voltage level of "−1V", and the second DC power source V on the negative potential side relative to midpoint $V_0$ has a voltage level of "−2V".

Power converter 100 can output a potential having a voltage level of "+2V" from an output terminal by turning switch elements S101, S102, S103 and S104 on, and can output a potential having a voltage level of "+1V" from the output terminal by turning switch elements S102, S103, S104 and S105 on. Power converter 100 can also output a potential having a voltage level of "0V" from the output terminal by turning switch elements S103, S104, S105 and S106 on. Power converter 100 can further output a potential having a voltage level of "−1V" from the output terminal by turning switch elements S104, S105, S106 and S107 on, and can output a potential having a voltage level of "−2V" from the output terminal by turning switch elements S105, S106, S107 and S108 on. Thus, power converter 100 can output five different levels ("−2V", "−1V", "0V", "+1V", "+2V") of voltages from the output terminal.

In power converter 100, however, when switch elements S105, S106, S107 and S108 are turned on in order to output a potential having a voltage level of "−2V" from the output terminal, diodes D102, D104 and D106 each have a voltage level of "−2V" at its anode terminal, with diode D102 having a cathode terminal connected to a voltage level of "+1V". Therefore, a voltage corresponding to the sum of voltages of three DC power sources V is applied to diode D102. Similarly, a voltage corresponding to the sum of voltages of two DC power sources V is applied to diode D104, and a voltage corresponding to a voltage of one DC power source V is applied to diode D106.

Moreover, in power converter 100, when switch elements S101, S102, S103 and S104 are turned on in order to output a potential having a voltage level of "+2V" from the output terminal, diodes D101, D103 and D105 each have a voltage level of "+2V" at its cathode terminal, with diode D105 having an anode terminal connected to a voltage level of "−1V". Therefore, a voltage corresponding to the sum of voltages of three DC power sources V is applied to diode D105. Similarly, a voltage corresponding to the sum of voltages of two DC power sources V is applied to diode D103, and a voltage corresponding to a voltage of one DC power source V is applied to diode D101.

As such, in the multilevel inverter disclosed in the aforementioned patent publication, diodes D102 and D105 connecting the DC power sources to the switch elements are required to have a breakdown voltage three times higher than that of diodes D101 and D106, and diodes D103 and D104 are required to have a breakdown voltage two times higher than that of diodes D101 and D106, respectively. For this reason, the multilevel inverter disclosed in the aforementioned patent publication needs to employ diodes having different breakdown voltages, or to connect two or three diodes in series to increase the breakdown voltage. Moreover, wiring needs to be connected from a node between two capacitors to positive and negative terminals of the serially connected switch elements through the diodes having the two types of breakdown voltages described above. This increases the complexity of the apparatus and the difficulty in manufacturing the apparatus.

Furthermore, in the multilevel inverter disclosed in the aforementioned patent publication, increasing the number of levels of voltages to be output requires higher breakdown voltages of the diodes. This increases the complexity of the configuration of the diodes connected between the DC power sources and the switch elements, and further increases the difficulty in manufacturing the apparatus.

SUMMARY OF THE INVENTION

An object of the present invention is to provide a power converter having an easy to manufacture configuration.

In summary, a power converter according to the present invention is a power converter capable of outputting $2^n+1$ (n is a natural number of 2 or more) different levels of voltages. The power converter includes a first charge storage element to a $2^n$th charge storage element connected in series in this order, a first switch element and a first diode connected in series in this order between terminals of the first charge storage element, a second diode and a second switch element connected in series in this order between terminals of the $2^n$th charge storage element, a third diode and a fourth diode connected in series in this order between terminals of each of the second charge storage element to a $2^n$–1th charge storage element, $2^n$ leads each connected to a node between the first switch element and the first diode, a node between the third diode and the fourth diode, and a node between the second diode and the second switch element, and $2^n$–1 switch circuits for selecting one of outputs output to the $2^n$ leads. The $2^n$–1 switch circuits are connected to select one of two adjacent leads, and are connected such that two of the switch circuits are connected in a previous stage and the remaining switch circuit is connected in a following stage to select one of outputs from the two switch circuits connected in the previous stage.

According to the present invention, therefore, elements required to have a breakdown voltage can be concentrated on the switch circuits regardless of the number of levels of voltages to be output, thereby realizing an easy to manufacture configuration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
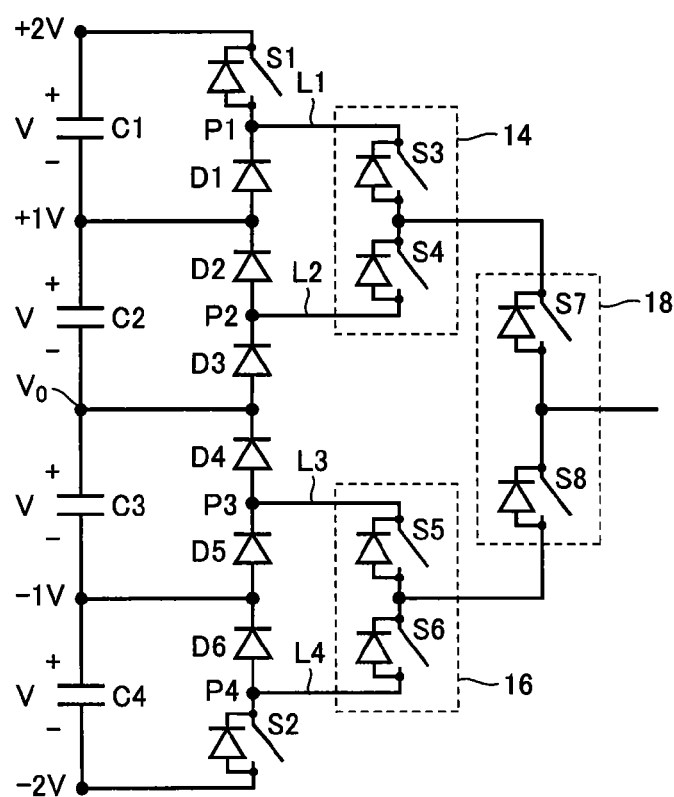
FIG. 1 is a circuit diagram illustrating a circuit configuration of a power converter according to an embodiment of the present invention.

The embodiments of the present invention will be hereinafter described in detail with reference to the drawings, in which the same or corresponding parts are designated by the same reference characters, and description thereof will not be repeated.

FIG. 1 is a circuit diagram illustrating a circuit configuration of a power converter according to an embodiment of the present invention. A power converter 10 illustrated in FIG. 1 is a five-level inverter capable of outputting five different levels of voltages.

Referring to FIG. 1, power converter 10 includes four DC power sources V, six diodes D1 to D6, eight switch elements S1 to S8, and an output terminal. It is noted that a free wheel diode is connected to each of switch elements S1 to S8.

Four DC power sources V are connected in series. DC power sources V are charge storage elements, and implemented as capacitors C1 to C4 by way of example. DC power sources V may be formed of charge storage elements other than capacitors, such as secondary batteries. Capacitors C1 to C4 each have a voltage of 1V across its terminals, with the middle point between capacitors C1 to C4 having a potential of $V_0$.

Six diodes D1 to D6 are connected in series in this order. The serial circuit of four capacitors C1 to C4 and the serial circuit of six diodes D1 to D6 are connected in parallel to each other via switch elements S1 and S2.

Switch element S1 and diode D1 are connected in series in this order between the terminals of capacitor C1. Diodes D2 and D3 are connected in series in this order between the terminals of capacitor C2. Diodes D4 and D5 are connected in series in this order between the terminals of capacitor C3. Diode D6 and switch element S2 are connected in series in this order between the terminals of capacitor C4.

Switch elements S3 and S4 are connected in series in this order between a lead L1 connected to a node P1 between switch element S1 and diode D1, and a lead L2 connected to a node P2 between diodes D2 and D3. Switch elements S3 and S4 form a switch circuit 14. When one of switch elements S3 and S4 is rendered conductive, switch circuit 14 selects either a potential output to lead L1 or a potential output to lead L2.

Switch elements S5 and S6 are connected in series in this order between a lead L3 connected to a node P3 between diodes D4 and D5, and a lead L4 connected to a node P4 between diode D6 and switch element S2. Switch elements S5 and S6 form a switch circuit 16. When one of switch elements S5 and S6 is rendered conductive, switch circuit 16 selects either a potential output to lead L3 or a potential output to lead L4.

Switch elements S7 and S8 are connected in series in this order between a node between switch elements S3 and S4 and a node between switch elements S5 and S6. Switch elements S7 and S8 form a switch circuit 18. Switch circuit 18 selects an output from either one of two switch circuits 14 and 16 connected in a previous stage.

Figure 2:
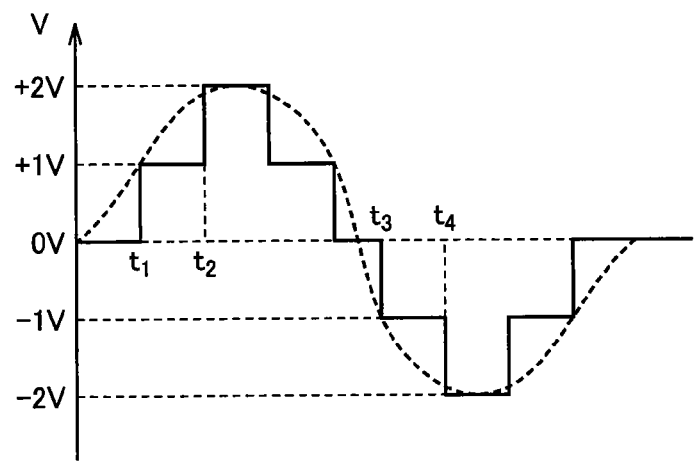
FIG. 2 is a waveform diagram illustrating a waveform of levels of voltages output from the power converter illustrated in FIG. 1.

The operation of power converter 10 is now described. FIG. 2 is a waveform diagram illustrating a waveform of levels of voltages output from power converter 10 illustrated in FIG. 1.

First, power converter 10 outputs a voltage having a level of "0V" from the output terminal by turning switch elements S4, S7 and S8 on. That is, when a current flows in a direction in which it is output from power converter 10 through the output terminal (hereinafter referred to simply as "output direction"), diode D3 and switch elements S4, S7 are rendered conductive. When a current flows in a direction in which it is input to power converter 10 through the output terminal (hereinafter referred to simply as "input direction"), the diodes of switch elements S8, S5, and diode D4 are rendered conductive. Then, at time $t_1$, power converter 10 outputs a voltage having a level of "+1V" from the output terminal by turning switch element S8 off and switch elements S3, S4, S7 on. That is, when a current flows in the output direction, diode D1 and switch elements S3, S7 are rendered conductive. When a current flows in the input direction, switch elements S7, S4 and diode D2 are rendered conductive.

Then, at time $t_2$, power converter 10 outputs a voltage having a level of "+2V" from the output terminal by turning switch element S4 off and switch elements S1, S3, S7 on. Subsequently, power converter 10 successively lowers the voltage level from the output terminal to "+1V" and "0V".

At time $t_3$, power converter 10 outputs a voltage having a level of "−1V" from the output terminal by turning switch elements S5, S6 and S8 on. That is, when a current flows in the output direction, diode D5 and switch elements S5, S8 are rendered conductive. When a current flows in the input direction, switch elements S8, S6 and diode D6 are rendered conductive. Then, at time $t_4$, power converter 10 outputs a voltage having a level of "−2V" from the output terminal by turning switch element S5 off and switch elements S2, S6, S8 on. Subsequently, power converter 10 successively raises the voltage level at the output terminal to "−1V" and "0V".

By performing the operation of switching between the five different levels of voltages (−2V, −1V, 0V, +1V, +2V) and outputting the voltage as described above, power converter 10 can output an AC voltage as indicated with a broken line illustrated in FIG. 2, thereby converting DC power to AC power.

In power converter 10, only a voltage corresponding to a voltage of one capacitor is applied to opposite ends of switch elements S1, S2 and diodes D1 to D6 when the switch elements are off. A voltage equal to or lower than 2V is applied to switch circuit 14, since a potential difference between terminals P1 and P2 is 2V at most. The same applies to switch circuit 16. When a voltage of "+2V" is to be output from the output terminal, a voltage which is the difference between the potential of +2V and the potential of lead L3 (i.e., not less than 2V and not more than 3V) is applied to switch circuit 18 by turning switch element S7 on, switch element S8 off and switch element S5 on.

As described above, in power converter 10 according to the embodiment of the present invention, the serial circuit of four DC power sources V and the serial circuit of six diodes are connected in parallel to each other via the two switch elements, and switch circuits 14, 16 and 18 select one of the potentials output to the four leads that are connected to the nodes between the switch elements and the diodes and the nodes between two adjacent diodes. Therefore, elements to which a high voltage is applied can be limited to the elements constituting switch circuits 14, 16 and 18, and they are connected in a simple manner. Accordingly, the number of elements required to have a high breakdown voltage can be concentrated on the switch circuits as compared to the conventional power converter (FIG. 5), and the connection is readily configured, thereby attaining an easy to manufacture configuration.

It is noted that the power converter according to the embodiment of the present invention is not limited to a power converter capable of outputting five different levels of voltages. The number of levels of voltages to be output can be readily increased by increasing the numbers of serially connected DC power sources and diodes, and switch circuits.

Figure 3:
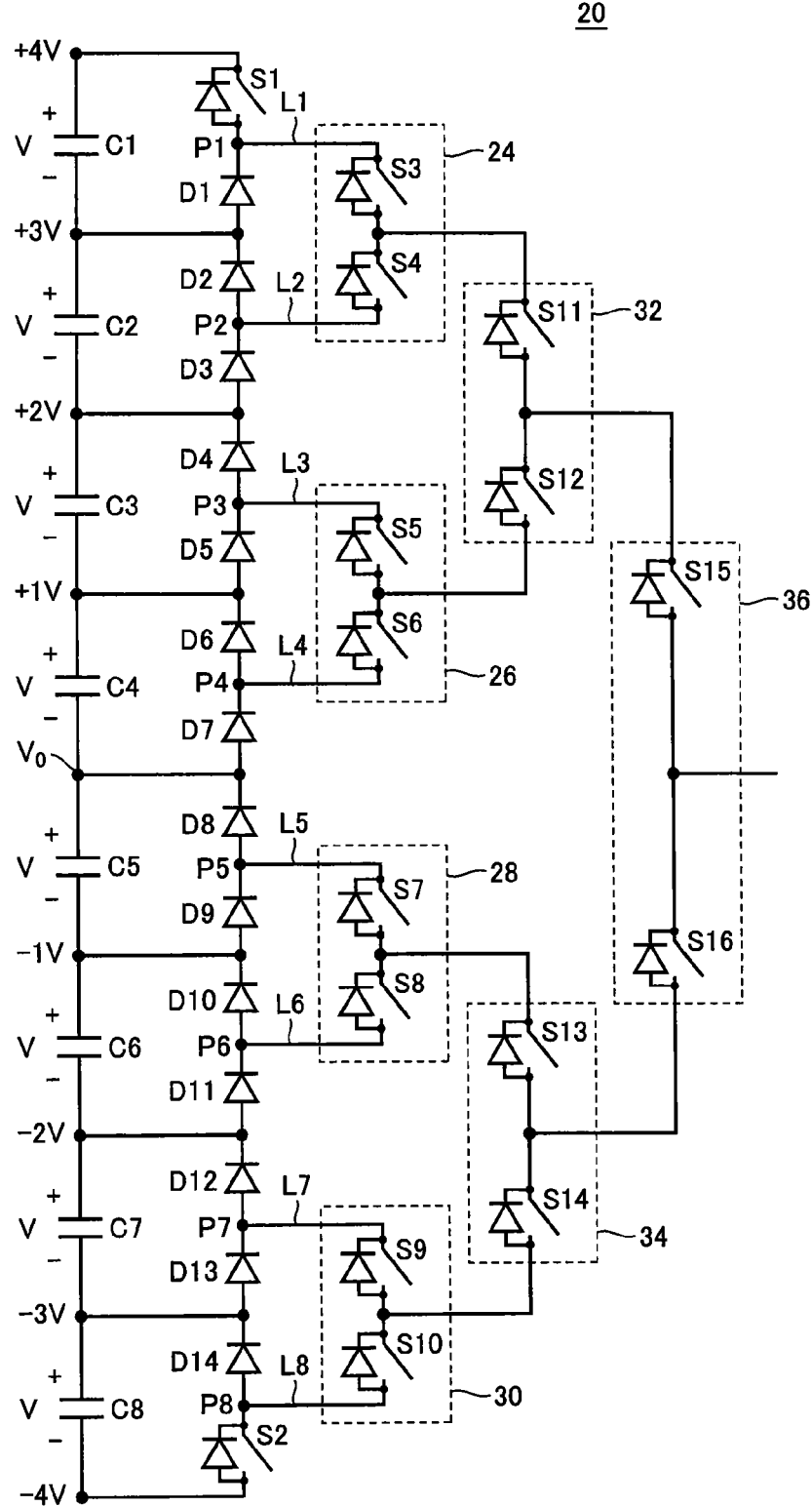
FIG. 3 is a circuit diagram illustrating another circuit configuration of a power converter according to the embodiment of the present invention.

FIG. 3 is a circuit diagram illustrating another circuit configuration of a power converter according to the embodiment of the present invention. A power converter 20 illustrated in FIG. 3 is a nine-level inverter capable of outputting nine different levels of voltages.

Referring to FIG. 3, power converter 20 includes eight DC power sources V, fourteen diodes D1 to D14, sixteen switch elements S1 to S16, and an output terminal. It is noted that a free wheel diode is connected to each of switch elements S1 to S16.

Eight DC power sources V are connected in series. DC power sources V are charge storage elements, and implemented as capacitors C1 to C8 by way of example. Capacitors C1 to C8 each have a voltage of 1V across its terminals, with the middle point between capacitors C1 to C8 having a potential of $V_O$.

Fourteen diodes D1 to D14 are connected in series in this order. The serial circuit of eight capacitors C1 to C8 and the serial circuit of fourteen diodes D1 to D14 are connected in parallel to each other via switch elements S1 and S2.

Switch element S1 and diode D1 are connected in series in this order between the terminals of capacitor C1. Diodes D2 and D3 are connected in series in this order between the terminals of capacitor C2. Diodes D4 and D5 are connected in series in this order between the terminals of capacitor C3. Likewise, two diodes are connected in series between the terminals of each of capacitors C4 to C7. Diode D14 and switch element S2 are connected in series in this order between the terminals of capacitor C8.

Switch elements S3 and S4 are connected in series in this order between lead L1 connected to node P1 between switch element S1 and diode D1, and lead L2 connected to node P2 between diodes D2 and D3. Switch elements S3 and S4 form a switch circuit 24. When one of switch elements S3 and S4 is rendered conductive, switch circuit 24 selects either a potential output to lead L1 or a potential output to lead L2.

Switch elements S5 and S6 are connected in series in this order between lead L3 connected to node P3 between diodes D4 and D5, and lead L4 connected to node P4 between diodes D6 and D7. Switch elements S5 and S6 form a switch circuit 26. When one of switch elements S5 and S6 is rendered conductive, switch circuit 26 selects either a potential output to lead L3 or a potential output to lead L4.

Switch elements S11 and S12 are connected in series in this order between a node between switch elements S3 and S4 and a node between switch elements S5 and S6. Switch elements S11 and S12 form a switch circuit 32. Switch circuit 32 selects one of outputs from two switch circuits 24 and 26 connected in a previous stage.

Switch elements S7 and S8 are connected in series in this order between a lead L5 connected to a node P5 between diodes D8 and D9, and a lead L6 connected to a node P6 between diodes D10 and D11. Switch elements S7 and S8 form a switch circuit 28. When one of switch elements S7 and S8 is rendered conductive, switch circuit 28 selects either a potential output to lead L5 or a potential output to lead L6.

Switch elements S9 and S10 are connected in series in this order between a lead L7 connected to a node P7 between diodes D12 and D13, and a lead L8 connected to a node P8 between diode D14 and switch element S2. Switch elements S9 and S10 form a switch circuit 30. When one of switch elements S9 and S10 is rendered conductive, switch circuit 30 selects either a potential output to lead L7 or a potential output to lead L8.

Switch elements S13 and S14 are connected in series in this order between a node between switch elements S7 and S8 and a node between switch elements S9 and S10. Switch elements S13 and S14 form a switch circuit 34. Switch circuit 34 selects one of outputs from two switch circuits 28 and 30 connected in a previous stage.

Switch elements S15 and S16 are connected in series in this order between a node between switch elements S11 and S12 and a node between switch elements S13 and S14. Switch elements S15 and S16 form a switch circuit 36. Switch circuit 36 selects one of outputs from two switch circuits 32 and 34 connected in a previous stage.

Figure 4:
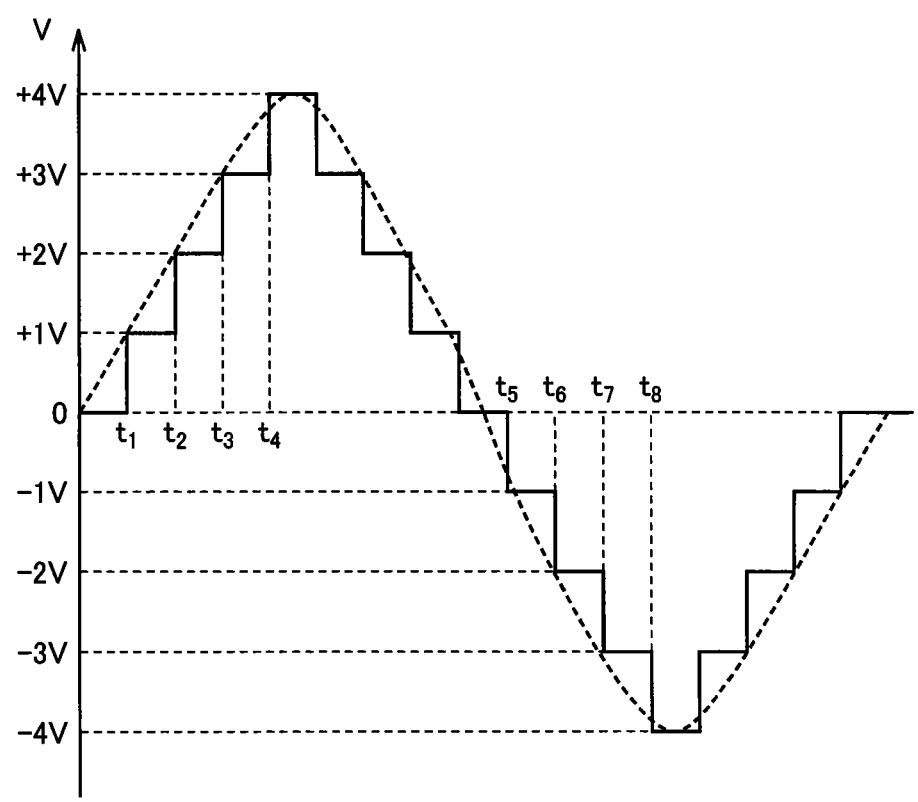
FIG. 4 is a waveform diagram illustrating a waveform of levels of voltages output from the power converter illustrated in FIG. 3.

The operation of power converter 20 is now described. FIG. 4 is a waveform diagram illustrating a waveform of levels of voltages output from power converter 20 illustrated in FIG. 3.

First, power converter 20 outputs a voltage having a level of "0V" from the output terminal by turning switch elements S6, S12, S15 and S16 on. That is, when a current flows in the output direction, diode D7 and switch elements S6, S12, S15 are rendered conductive. When a current flows in the input direction, the diodes of switch elements S16, S13, the diode of S7, and diode D8 are rendered conductive. Then, at time $t_1$, power converter 20 outputs a voltage having a level of "+1V" from the output terminal by turning switch element S16 off and switch elements S5, S6, S12, S15 on. That is, when a current flows in the output direction, diode D5 and switch elements S5, S12, S15 are rendered conductive. When a current flows in the input direction, switch elements S15, S12, S6, and diode D6 are rendered conductive.

Then, at time $t_2$, power converter 20 outputs a voltage having a level of "+2V" from the output terminal by turning switch element S5 off and switch elements S4, S11, S12, S15 on. That is, when a current flows in the output direction, diode D3 and switch elements S4, S11, S15 are rendered conductive. When a current flows in the input direction, switch elements S15, S12, the diode of switch element S5, and diode D4 are rendered conductive. Then, at time $t_3$, power converter 20 outputs a voltage having a level of "+3V" from the output terminal by turning switch element S12 off and switch elements S3, S4, S11, S15 on. That is, when a current flows in the output direction, diode D1 and switch elements S3, S11, S15 are rendered conductive. When a current flows in the input direction, switch elements S15, S11, S4, and diode D2 are rendered conductive. Then, at time $t_4$, power converter 20 outputs a voltage having a level of "+4V" at the output terminal by turning switch element S4 off and switch elements S1, S3, S11, S15 on. Subsequently, power converter 20 successively lowers the voltage level at the output terminal to "+3V", "+2V", "+1V" and "0V".

At time $t_5$, power converter 20 outputs a voltage having a level of "−1V" from the output terminal by turning switch elements S7, S8, S13 and S16 on. That is, when a current flows in the output direction, diode D9 and switch elements S7, S13, S16 are rendered conductive. When a current flows in the input direction, switch elements S16, S13, S8, and diode D10 are rendered conductive. Then, at time $t_6$, power converter 20 outputs a voltage having a level of "−2V" from the output terminal by turning switch element S7 off, and switch elements S8, S13, S14, S16 on. That is, when a current flows in the output direction, diode D11 and switch elements S8, S13, S16 are rendered conductive. When a current flows in the input direction, switch elements S16, S14, the diode of switch element S9, and diode D12 are rendered conductive.

Then, at time $t_7$, power converter 20 outputs a voltage having a level of "−3V" from the output terminal by turning switch element S13 off, and switch elements S9, S10, S14, S16 on. That is, when a current flows in the output direction, diode D13 and switch elements S9, S14, S16 are rendered conductive. When a current flows in the input direction, switch elements S16, S14, S10, and diode D14 are rendered conductive. Then, at time $t_8$, power converter 20 outputs a voltage having a level of "−4V" from the output terminal by turning switch element S9 off, and switch elements S2, S10, S14, S16 on. Subsequently, power converter 20 successively raises the voltage level at the output terminal to "−3V", "−2V", "−1V" and "0V".

By performing the operation of switching between the nine different levels (−4V, −3V, −2V, −1V, 0V, +1V, +2V, +3V, +4V) of voltages and outputting the voltage as described above, power converter 20 can output an AC voltage as indicated with a broken line illustrated in FIG. 4, thereby converting DC power to AC power.

Although only the switch elements associated with output have been described in the above description of the switching operation, the other switch elements may be in any switching state as long as a short circuit is not created between the opposite terminals of the charge storage elements. For example, when a voltage having a level of +4V is being output from the output terminal with switch elements S1, S3, S11 and S15 turned on, switch elements S12 and S16 cannot be turned on, but switch element S5 can be turned on to fix the potential of one terminal of switch element S12 to the potential of node P3. If switch element S6 is turned on, the potential of the one terminal of switch element S12 becomes equal to the potential of node P4, thus increasing the voltage across the terminals of switch element S12. In short, by turning switch element S5 on, the breakdown voltage of switch element 12 in an off state can be reduced. Likewise, if switch elements S7 and S13 are turned on, the potential of one terminal of switch element S16 can be fixed to the potential of node P5, thus reducing the breakdown voltage of switch element S16 as compared to when switch elements S8, S14 and the like are turned on.

As has been described above, in the power converter according to the embodiment of the present invention, the number of levels of voltages to be output can be increased by increasing the numbers of serially connected DC power sources and diodes, and switch circuits. The power converter according to the embodiment of the present invention can be generalized as follows.

In other words, the power converter according to the embodiment of the present invention is a power converter capable of outputting $2^n+1$ (n is a natural number of 2 or more) different levels of voltages, and includes a first charge storage element to a $2^n$th charge storage element connected in series in this order, a first switch element and a first diode connected in series in this order between terminals of the first charge storage element, a second diode and a second switch element connected in series in this order between terminals of the $2^n$th charge storage element, a third diode and a fourth diode connected in series in this order between terminals of each of the second charge storage element to a $2^n-1$th charge storage element, $2^n$ leads connected to a node between the first switch element and the first diode, a node between each of the third diodes and the fourth diodes, and a node between the second diode and the second switch element, and $2^n-1$ switch circuits for selecting one of outputs output to the $2^n$ leads. The $2^n-1$ switch circuits are connected to select one of two adjacent leads, and are connected such that two of the switch circuits are connected in a previous stage and the remaining switch circuit is connected in a following stage to select one of outputs from two the switch circuits connected in the previous stage.

Although the power converter according to the embodiment of the present invention has been described by limiting the number of selections of levels of voltages during a single AC cycle for the purpose of simplifying the explanation of the operation of switching between the switching elements, a smoother AC voltage can be output by selecting levels of voltages a plurality of times by performing the switching operation a plurality of times during a single AC cycle, thereby providing a power converter with suppressed harmonic components.

This power converter is not limited to output an alternating current, but can produce a desired DC voltage by appropriately changing the order of switching.

Figure 5:
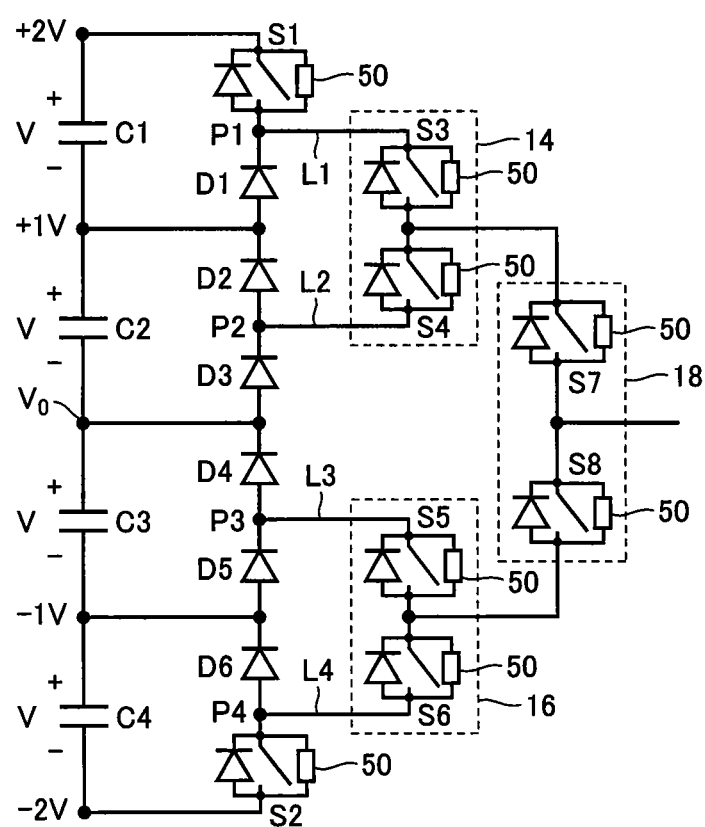
FIG. 5 is a circuit diagram illustrating another circuit configuration of a power converter according to the embodiment of the present invention.
Figure 6:
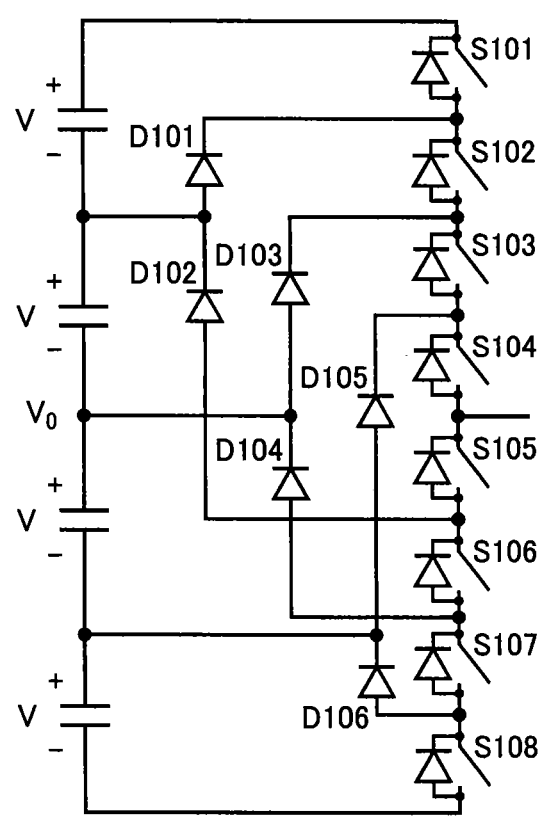
FIG. 6 is a circuit diagram illustrating a circuit configuration of a conventional power converter.

Although the charge storage elements are directly coupled to the switch elements or the diodes in the power converter according to the embodiment of the present invention, this is not intended to be limiting, and snubber circuits 50 for suppressing a sudden current variation in transition between on and off of the switch elements may be provided, for example, as illustrated in FIG. 5.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power converter comprising:
   a first charge storage element to a $2^n$th charge storage element connected in this order to form a circuit of $2^n$ charge storage elements, n being a natural number of 2 or more;
   a first switch element and a first diode connected in this order between terminals of said first charge storage element;
   a second diode and a second switch element connected in this order between terminals of said $2^n$th charge storage element;
   a third diode and a fourth diode connected in this order between terminals of each of the second charge storage element to a $2^n-1$th charge storage element;
   the first, second, third, and fourth diodes defining a circuit of $2^{n+1}-2$ diodes, the circuit of the $2^n$ charge storage elements and the circuit of the $2^{n+1}-2$ diodes being connected in parallel to each other via the first switch element and the second switch element;
   $2^n$ leads each connected to a node between said first switch element and said first diode, a node between said third diode and said fourth diode, and a node between said second diode and said second switch element; and
   $2^n-1$ switch circuits for selecting one of outputs output to said $2^n$ leads,
   said $2^n-1$ switch circuits being connected to select one of two adjacent said leads, and being connected such that two of said switch circuits are connected in a previous stage and the remaining said switch circuit is connected in a following stage to select one of outputs from two said switch circuits connected in said previous stage and controlled such that the power converter outputs an alternating current (AC) voltage by outputting a plurality of direct current (DC) voltages that increase monotonically as the AC voltage increases and decrease monotonically as the AC voltage decreases.

2. The power converter according to claim 1, further comprising a snubber circuit for suppressing a sudden current variation between said first switch element and said first charge storage element, between said second switch element and said second charge storage element, and between said third and fourth diodes and said second charge storage element to said $2^n-1$th charge storage element, respectively.

3. The power converter according to claim 1, wherein an on state or an off state of a switch element connected to switch elements forming said switch circuits is selected such that a voltage applied to the switch elements becomes a minimum when the switch elements are off.

* * * * *